(12) United States Patent
Hu et al.

(10) Patent No.: US 10,800,415 B2
(45) Date of Patent: Oct. 13, 2020

(54) ELECTRICALLY-ASSISTED ENGINE BRAKING

(71) Applicant: Ford Global Technologies, LLC, Dearborn, MI (US)

(72) Inventors: Liangjun Hu, Bloomfield Hills, MI (US); Devesh Upadhyay, Canton, MI (US); Kang Song, Tianjin (CN)

(73) Assignee: Ford Global Technologies, LLC, Dearborn, MI (US)

( * ) Notice: Subject to any disclaimer, the term of this patent is extended or adjusted under 35 U.S.C. 154(b) by 36 days.

(21) Appl. No.: 16/194,171

(22) Filed: Nov. 16, 2018

(65) Prior Publication Data
US 2020/0156643 A1    May 21, 2020

(51) Int. Cl.
| | |
|---|---|
| *B60W 20/15* | (2016.01) |
| *B60W 30/18* | (2012.01) |
| *B60W 10/06* | (2006.01) |
| *B60W 10/26* | (2006.01) |
| *B60K 6/485* | (2007.10) |

(52) U.S. Cl.
CPC ...... *B60W 30/18136* (2013.01); *B60W 10/06* (2013.01); *B60W 10/26* (2013.01); *B60W 20/15* (2016.01); *B60K 6/485* (2013.01); *B60L 2240/423* (2013.01); *B60W 2510/244* (2013.01)

(58) Field of Classification Search
CPC ........... B60W 30/18136; B60W 20/15; B60W 10/06; B60W 10/26
USPC .......................................................... 318/139
See application file for complete search history.

(56) References Cited

U.S. PATENT DOCUMENTS

| | | | |
|---|---|---|---|
| 6,338,391 B1 | 1/2002 | Severinsky et al. | |
| 6,459,980 B1* | 10/2002 | Tabata ..................... | B60K 6/46 |
| | | | 701/70 |
| 6,594,996 B2 | 7/2003 | Yang | |
| 8,784,263 B2 | 7/2014 | Takahashi et al. | |
| 2011/0036088 A1* | 2/2011 | Xin .......................... | F02D 9/06 |
| | | | 60/605.1 |
| 2013/0133965 A1 | 5/2013 | Books | |
| 2015/0047617 A1* | 2/2015 | Benjey ................... | B60K 6/485 |
| | | | 123/559.3 |

FOREIGN PATENT DOCUMENTS

| | | | |
|---|---|---|---|
| JP | H0988619 A | | 3/1997 |
| JP | 2016125365 A | * | 7/2016 |

OTHER PUBLICATIONS

Machine translation JP09088619A (Year: 1997).*

* cited by examiner

*Primary Examiner* — Kawing Chan
(74) *Attorney, Agent, or Firm* — Geoffrey Brumbaugh; McCoy Russell LLP

(57) ABSTRACT

Methods and systems are provided for electrically-assisted engine braking. In one example, a method may include operating a turbocharger by an electric motor during engine braking to increase air flow to an engine intake. The enhanced air flow into the engine intake increases an exhaust manifold pressure, thus increased a braking force provided by engine braking.

17 Claims, 6 Drawing Sheets

ELECTRICALLY-ASSISTED ENGINE BRAKING

FIELD

The present description relates generally to methods and systems for engine braking in a vehicle.

BACKGROUND/SUMMARY

In diesel-powered and lean burning boosted gasoline-powered vehicles, a desired rate of deceleration of an engine may not be available by releasing an accelerator pedal due to unthrottled air flow to the engine. Instead, restriction to air flow may be dependent on flow capacities of components directly in the path of flow including an air cleaner, a boosting device such as a turbocharger compressor, an intercooler, an intake manifold, and a port and intake valve opening in a cylinder head. Without additional assistance, slowing of the engine may rely solely on mechanical brakes, rendering the mechanical brakes prone to overheating and subject to frequent usage, thereby accelerating degradation of the mechanical brakes.

Deceleration of the diesel engine may be assisted by adapting the vehicle with exhaust brakes. The exhaust brakes include a mechanism to increase an exhaust pressure in the vehicle's exhaust manifold and cylinders, resulting in backpressure that resists a compression stroke of the cylinders' pistons, while also reducing fresh airflow through the engine. The engine torque may be reduced by restricting exhaust gas flow out of the exhaust manifold which may be achieved by adapting the engine with an exhaust valve upstream of an exhaust turbine or by closing vanes of a variable geometry turbocharger (VGT). When the vanes are closed, openings between the VGT vanes are narrowed, restricting an amount of exhaust gas directed to the turbine to drive rotation of the VGT and allowing pressure to accumulate in the exhaust manifold.

Exhaust braking may be used in combination with regenerative braking in a hybrid electric vehicle (HEV) to further assist in slowing vehicle speed when braking is requested. During regenerative braking, an electric motor of the HEV may act as generator, recuperating kinetic energy used for braking and storing the energy in an energy storage device coupled to the motor, such as a vehicle battery. Combining regenerative braking with exhaust braking further alleviates wear and tear associated with application of mechanical brakes to reduce vehicle speed and also increase a fuel economy of the HEV by charging the vehicle battery during braking events.

An amount of braking torque provided by the exhaust brake may be based on a pressure gradient generated between the exhaust manifold and an intake manifold of the engine. The pressure in the exhaust manifold may be determined by the minimum width, or flow area, of the closed VGT vanes when the VGT is used, and/or a maximum intake flow rate of the engine when either the VGT or the exhaust valve is used. In some examples, the minimum flow area of the VGT and maximum intake flow rate of the engine may not allow enough restriction of exhaust flow to generate exhaust pressure that reduces vehicle speed sufficiently.

Attempts to address ineffective exhaust braking include adapting an engine with a supercharger to increase exhaust pressure in an exhaust manifold. One example approach is shown by Hirai et al. in Japanese Application No. JPH 0988619. Therein, the supercharger is operated during exhaust braking, supplying boosted air directly to an exhaust pipe upstream of an exhaust valve by actuating a switch that alters flow of supercharged air from an intake manifold to the exhaust pipe. An exhaust manifold pressure is increased when the exhaust valve is commanded to close upon activation of the exhaust brakes, blocking flow of exhaust gas to a turbocharger turbine. The exhaust braking may be used in combination with regenerative braking to recharge a battery supplying power to an electric motor of the supercharger. A braking force supplied by exhaust braking is thereby enhanced.

However, the inventors herein have recognized potential issues with such systems. As one example, the operation of the supercharger to increase the exhaust manifold pressure does not increase the intake flow rate of an engine intake manifold and may result in significant lag in the engine braking response. As well, the increase in pressure provided by the supercharger may not be regulated by adjusting an opening of the exhaust valve. Furthermore, when a state of charge (SOC) of the battery reaches 100%, continued charging of the battery may lead to battery degradation. Thus, when the battery SOC is at 100%, regenerative braking may no longer be used and a reliance on mechanical brakes may be increased.

In one example, the issues described above may be addressed by a method including consuming electrical energy from a battery to increase a braking torque during engine braking in response to a battery SOC being greater than a threshold SOC. In this way, a braking force may be consistently enhanced by both engine braking and regenerative braking.

As one example, operating the turbocharger in response to a braking request may allow both an exhaust manifold pressure and an intake flow rate to increase, thereby compounding their effects in increasing engine braking. A turbocharger speed and an opening of VGT vanes may be adjusted according to a control regime that balances a desirable amount of engine braking while accounting for a maximum speed and pressure tolerance of the turbocharger turbine. The control strategy may also enable continuous braking assistance by regenerative braking by monitoring an SOC of a vehicle battery and balancing energy consumed by operation of the electric motor during engine braking with battery charging facilitated by regenerative braking. As a result, use of mechanical brakes may be reduced, prolonging a useful lifetime of the mechanical brakes and decreasing costs associated with maintenance and replacement. Additionally, a fuel economy of the vehicle may be increased.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
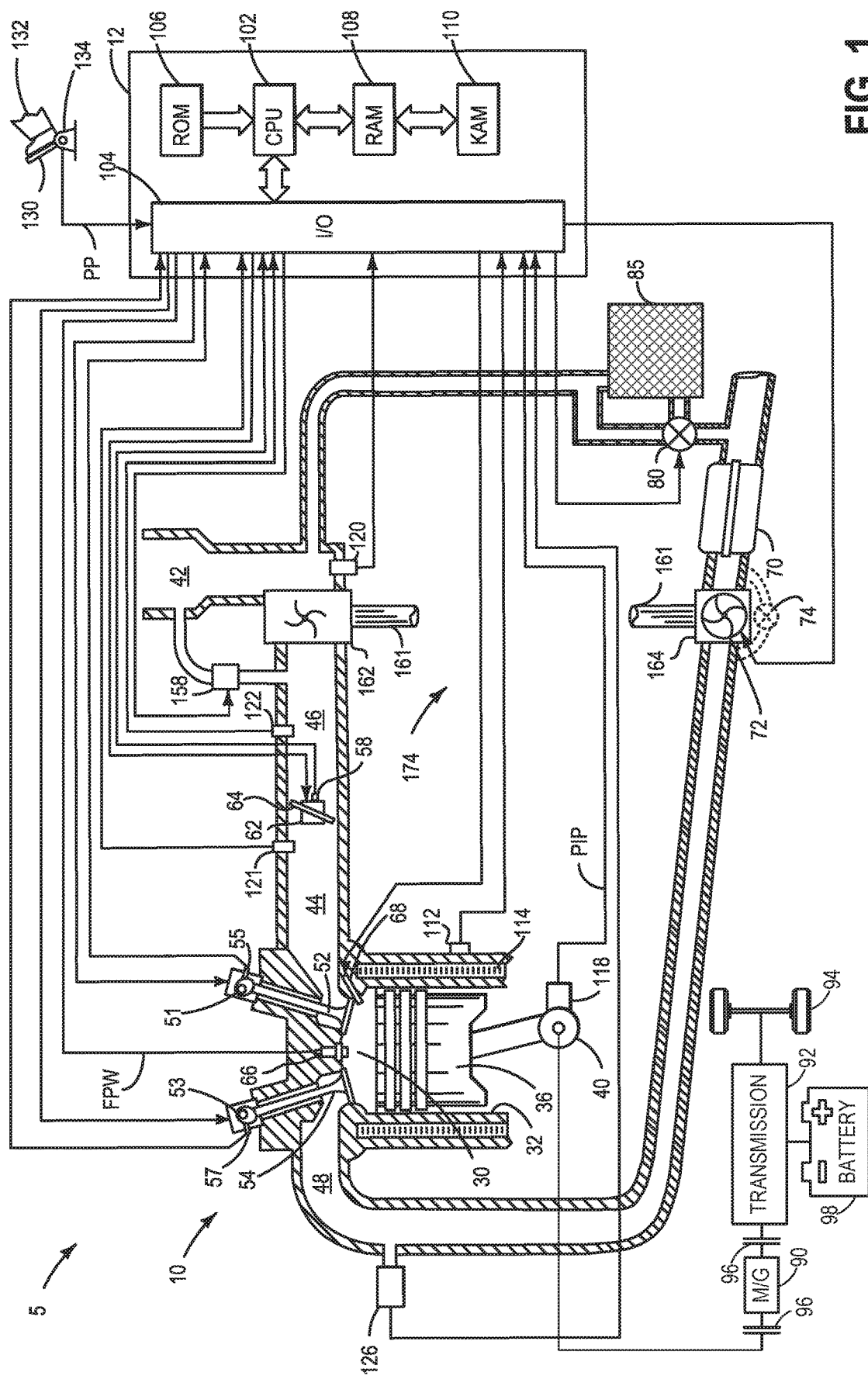
FIG. 1 shows a schematic diagram of an engine for a hybrid electric vehicle adapted with a variable geometry turbocharger (VGT).
Figure 2:
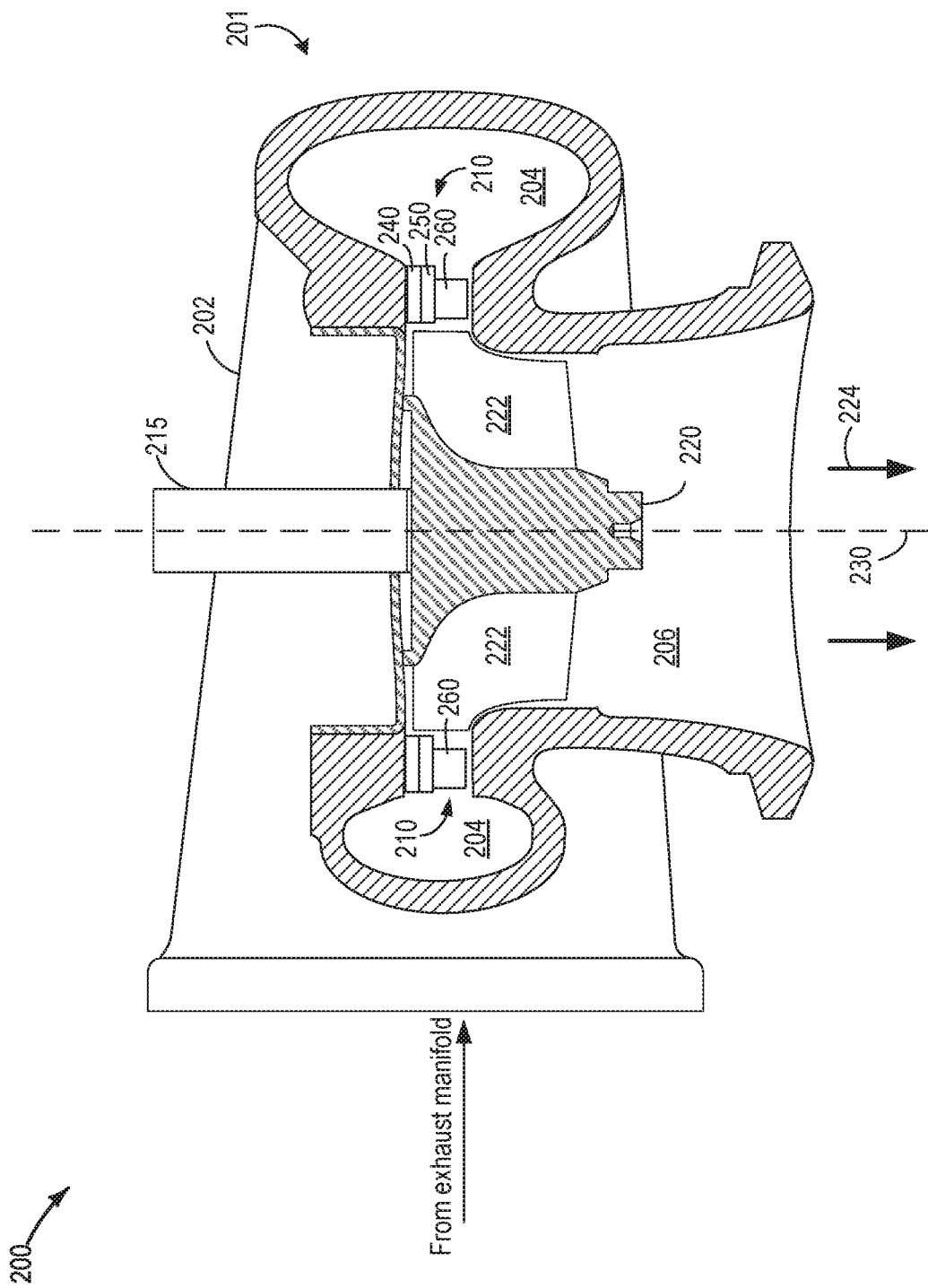
FIG. 2 shows a cross-section of an example embodiment of a turbine of the VGT, including a turbine nozzle.
Figure 3:
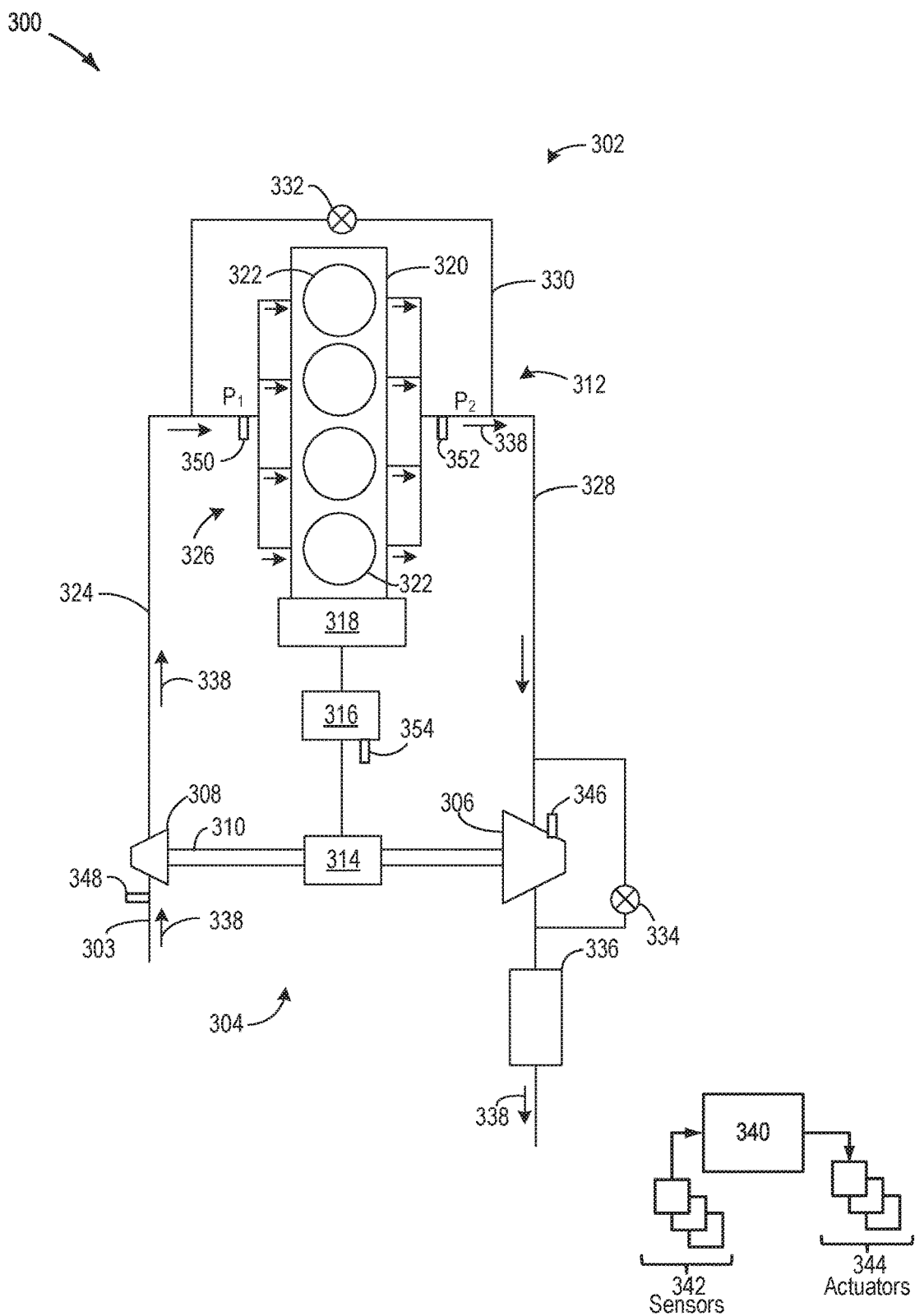
FIG. 3 shows a coupling of an electrically-assisted turbocharger to an engine system and operations occurring during a braking event of the vehicle.
Figure 4:
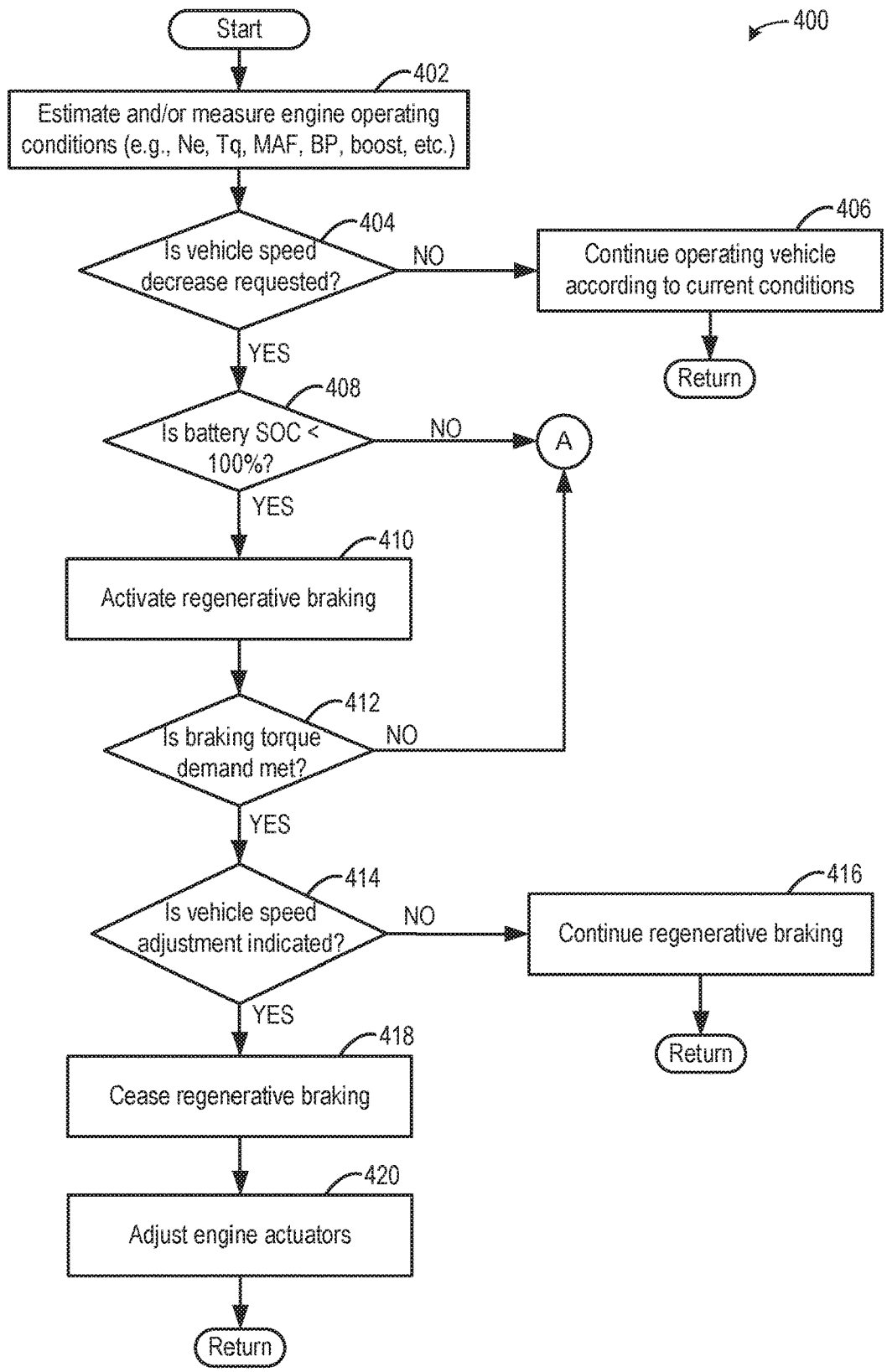
FIG. 4 shows an example of a method for actuating engine braking in response to a braking request detected in the vehicle.

The following description relates to systems and methods for increasing an engine braking power while maintaining use of regenerative braking. Exhaust braking may be used in a diesel engine, leveraging an increased exhaust manifold pressure to oppose a compression stroke of the engine and retard engine speed. Regenerative braking may be combined with exhaust braking to provide additional braking force while recuperating braking energy to recharge an electrical storage device of a vehicle. Thus, the collaborative use of exhaust braking and regenerative braking may be particularly attractive for hybrid electric vehicles (HEV) that include a traction battery to propel the HEV, thereby reducing usage of mechanical friction brakes and increasing a fuel economy of the HEV. However, an upper boundary on braking torque provided by exhaust braking may be attributed to a flow of intake air to the engine. This issue may be addressed by a method for engine braking that enhances air flow while restricting exhaust gas flow to an exhaust turbine. An example of a hybrid electric diesel engine that may use the method for engine braking is shown in a schematic diagram in FIG. 1. The engine may include a variable geometry turbocharger adapted with an exhaust-driven turbine. The turbine may have a plurality of vanes that regulates a flow of exhaust gas through a nozzle of the turbine. An example of the turbine is shown in a cross-section in FIG. 2, depicting a positioning of mobile vanes within the turbine nozzle. The VGT may be coupled to an electric motor that may power operation of the VGT when activated. Adjustment of the VGT turbine vanes may be coordinated with rotation of the VGT, as driven by the electric motor, to enhance a braking power provided via engine braking. Operations of the electric motor, VGT, and engine may be illustrated by a schematic diagram shown in FIG. 3, depicting the VGT coupled to the electric motor and driving changes in pressure in targeted regions of the engine. An example of a method for slowing the vehicle speed by engine braking is shown in FIG. 4 and continued in FIG. 5, describing adjustments to braking operations based on a state of charge (SOC) of the vehicle battery, on pressure and speed tolerances of the turbine, and also based on a desired braking power. Example engine operations conducted during implementation of electrically-assisted engine braking are shown in FIG. 6, including to an amount of torque generated at the electric motor to operate the VGT in response positioning of the VGT vanes as well as to requests to vary vehicle speed.

FIG. 2 shows example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

Engine braking may be used in diesel engines due to a lack of throttling of intake air, in contrast to spark-ignition engines that combust other fuels, such as gasoline. By restricting flow of exhaust gas out of an exhaust manifold in combination with increasing air flow into the engine, a braking power provided by engine braking may be increased relative to a braking power supplied by exhaust braking where exhaust gas flow is restricted without increasing intake air flow. FIG. 1 shows a schematic depiction of an internal combustion engine 10 of a vehicle 5 that may be configured to combust diesel, comprising a plurality of cylinders, one cylinder of which is shown in FIG. 1. Engine 10 is controlled by electronic engine controller 12. In other examples, engine 10 may be adapted as a spark-ignition engine, configured to combust other types of fuel, such as gasoline. Engine 10 includes combustion chamber 30 and cylinder walls 32 with piston 36 positioned therein and connected to crankshaft 40. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57.

Fuel injector 66 is shown positioned to inject fuel directly into combustion chamber 30, which is known to those skilled in the art as direct injection. Fuel injector 66 delivers fuel in proportion to the pulse width of signal FPW from controller 12. Fuel is delivered to fuel injector 66 by a fuel system. Excess fuel from fuel injector 66 (e.g. after a pilot fuel injection) may be returned to a fuel tank via a fuel return line (not shown).

Intake manifold 44 is shown communicating with optional electronic throttle 62 which adjusts a position of throttle plate 64 to control air flow from intake boost chamber 46. Compressor 162 draws air from air intake 42 to supply boost chamber 46. Exhaust gases spin turbine 164 which is coupled to compressor 162 via shaft 161. Turbine 164, shaft 161, and compressor 162 may be components of a variable geometry turbocharger (VGT) 174, the VGT 174 adapted with mobile vanes that adjust flow of exhaust gas in the turbine 164. In some examples, a charge air cooler may be provided. Compressor speed may be adjusted via adjusting a position of variable vane control 72 or compressor bypass valve 158. In alternative examples, a waste gate 74 may replace or be used in addition to variable vane control 72. Variable vane control 72 adjusts a position of the VGT vanes. Exhaust gases may pass through turbine 164 supplying little energy to rotate turbine 164 when vanes are in an open position. Exhaust gases can pass through turbine 164 and impart increased force on turbine 164 when vanes are in a closed position. Alternatively, waste gate 74 allows exhaust gases to flow around turbine 164 so as to reduce the amount of energy supplied to the turbine. Compressor bypass valve 158 allows compressed air at the outlet of compressor 162 to be returned to the input of compressor 162. In this way, the efficiency of compressor 162 may be reduced so as to affect the flow of compressor 162 and reduce the possibility of compressor surge.

In other examples, turbocharger 174 may be a fixed geometry turbocharger (FGT). A turbine nozzle of the FGT may have a fixed width without vanes or may have vanes in a fixed position, e.g., vanes that are not mobile. Flow of exhaust gas to the FGT turbine 164 is adjustable based on an opening of the waste gate 74. When the waste gate 74 is fully closed, gas flow may be entirely directed to the turbine 164. When the opening of the waste gate 74 is increased to be more open than fully closed, at least a portion of the exhaust gas flow may be diverted around the turbine 164 via a bypass provided by the waste gate 74, thereby reducing a rotational speed of the FGT.

Combustion is initiated in combustion chamber 30 when fuel ignites without a dedicated spark source such as a spark plug as piston 36 approaches top-dead-center compression stroke and cylinder pressure increases. In some examples, a universal Exhaust Gas Oxygen (UEGO) sensor 126 may be coupled to exhaust manifold 48 upstream of emissions device 70. In other examples, the UEGO sensor may be located downstream of one or more exhaust after treatment devices. Further, in some examples, the UEGO sensor may be replaced by a NOx sensor that has both NOx and oxygen sensing elements.

At lower engine temperatures glow plug 68 may convert electrical energy into thermal energy so as to raise a temperature in combustion chamber 30. By raising a temperature of combustion chamber 30, it may be easier to ignite a cylinder air-fuel mixture via compression. Emissions device 70 can include a particulate filter and catalyst bricks, in one example. In another example, multiple emission control devices, each with multiple bricks, can be used. Emissions device 70 can include an oxidation catalyst in one example. In other examples, the emissions device may include a lean NOx trap or a selective catalyst reduction (SCR), and/or a diesel particulate filter (DPF).

Exhaust gas recirculation (EGR) may be provided to the engine via EGR valve 80. EGR valve 80 is a three-way valve that closes or allows exhaust gas to flow from downstream of emissions device 70 to a location in the engine air intake system upstream of compressor 162. In alternative examples, EGR may flow from upstream of turbine 164 to intake manifold 44. EGR may bypass EGR cooler 85, or alternatively, EGR may be cooled via passing through EGR cooler 85. In other examples, high pressure and low pressure EGR system may be provided.

Controller 12 is shown in FIG. 1 as a conventional microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing accelerator position adjusted by foot 132; a measurement of engine manifold pressure (MAP) from pressure sensor 121 coupled to intake manifold 44; boost pressure from pressure sensor 122, exhaust gas oxygen concentration from oxygen sensor 126; an engine position sensor from a Hall effect sensor 118 sensing crankshaft 40 position; a measurement of air mass entering the engine from sensor 120 (e.g., a hot wire air flow meter); and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In some examples, fuel may be injected to a cylinder a plurality of times during a single cylinder cycle. In a process hereinafter referred to as ignition, the injected fuel is ignited by compression ignition resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is described merely as an example, and that intake and exhaust valve opening and/or closing timings may vary, such as to provide positive or negative valve overlap, late intake valve closing, or various other examples. Further, in some examples a two-stroke cycle may be used rather than a four-stroke cycle.

In some examples, vehicle 5 may be a hybrid vehicle with multiple sources of torque available to one or more vehicle wheels 94. In the example shown, vehicle 5 includes engine 10 and an electric machine 90. Electric machine 90 may be a motor or a motor/generator. Crankshaft 40 of engine 10 and electric machine 90 are connected via a transmission 92 to vehicle wheels 94 when one or more clutches 96 are engaged. In the depicted example, a first clutch 96 is provided between crankshaft 40 and electric machine 90, and a second clutch 96 is provided between electric machine 90 and transmission 92. Controller 12 may send a signal to an actuator of each clutch 96 to engage or disengage the clutch, so as to connect or disconnect crankshaft 40 from electric machine 90 and the components connected thereto, and/or connect or disconnect electric machine 90 from transmission 92 and the components connected thereto. Transmission 92 may be a gearbox, a planetary gear system, or another type of transmission. The powertrain may be configured in various manners including as a parallel, a series, or a series-parallel hybrid vehicle.

Electric machine 90 receives electrical power from a traction battery 98 to provide torque to vehicle wheels 94. Electric machine 90 may also be operated as a generator to provide electrical power to charge battery 98, for example, during a braking operation.

As described above, a VGT may be included in an engine to provide boosted air to the engine intake. Variable vanes of the VGT may be arranged in a nozzle of a VGT turbine, controlling flow of exhaust gas to the turbine, the exhaust gas flow driving rotation of the VGT. The flow of exhaust gases through the VGT turbine may be further illustrated by an example embodiment of a turbine 201, shown in a cross-section 200 in FIG. 2. In one example, the turbine 201 may be used similarly to the turbine 164 of FIG. 1. Turbine 201 may include a volute or housing 202 that encloses a turbine nozzle 210 and a turbine wheel 220 having turbine blades 222. For example, housing 202 may include an inlet passage 204 in communication with turbine nozzle 210. Turbine nozzle 210 may be in communication with inlet passage 204. Thus, exhaust gas may flow from an exhaust manifold, e.g., exhaust manifold 48 of FIG. 1, through inlet passage 204, through turbine nozzle 210, across turbine wheel 220 and turbine blades 222 into passage 206, and out of the turbine 201 as indicated by arrows 224 towards an emissions device, such as the emissions device 70 of FIG. 1. Further, the flow of exhaust gases, e.g. the expansion of gases, through turbine 201 may be controlled by varying the geometry of turbine nozzle 210, and thus, the rotational speed of turbine 201 may be adjusted.

In one embodiment, turbine nozzle 210 may be generally annular and share a central axis 230 with turbine wheel 220 and a drive shaft 215. In other words, turbine wheel 220 and turbine nozzle 210 may be coaxial and concentric. Turbine nozzle 210 may include an annular unison ring 240, an annular nozzle wall plate 250, and one or more nozzle vanes 260. In one embodiment, unison ring 240 and nozzle wall plate 250 may form a support and control structure for the nozzle vanes 260. As such, in one example, the shape of the nozzle vanes 260 may be adjusted by rotating one or both of unison ring 240 and nozzle wall plate 250.

A geometry of the nozzle vanes 260 may be adjusted to control the flow of gases through turbine nozzle 210. For example, in a split sliding nozzle vane turbine (SSVNT), a length of the nozzle vanes 260 may be adjusted to control the flow of gases through turbine nozzle 210. In this example, a sliding vane of the nozzle vanes 260 may slide in a direction tangentially from an outer circumference of the nozzle wall plate 250. The aforementioned arrangement may be herein referred to as a conventional sliding vane embodiment.

In another embodiment contrasting the conventional sliding vane embodiment, a sliding vane of the nozzle vane 260s may slide back into and out from a recess or well over a range of engine operating conditions. More specifically, the sliding vane of the nozzle vanes 260 may slide axially into the nozzle wall plate 250, for example, in a direction parallel to the central axis 230 rather than tangentially from the outer circumference of the nozzle wall plate 250.

In yet another embodiment, a swing or pivot nozzle vane turbine may be provided in place of the SSVNT. One or more of the nozzle vanes 260 of a swing or pivot nozzle vane turbine may pivot around an axis parallel with the central axis 230. The swing or pivot nozzle vane turbine may vary the flow of exhaust gas through turbine 201 by controlling an angle at which exhaust gas strikes the turbine blades 222.

Regardless of a type of turbine nozzle described above, varying the geometry of the nozzle vanes 260 and/or the orientation of the nozzle vanes 260 may vary the cross-sectional area of the inlet passages 204 of turbine nozzle 210 and the volumetric flow of gas through inlet passages 204. By adjust the flow of gas through inlet passages 204, a velocity of the gas striking the turbine blades 222 may be moderated. By closing the nozzle vanes 260, e.g., narrowing openings between each of the nozzle vanes 260, a flow velocity of gas may be increased when the gas contacts the turbine blades 222, thereby increasing a rotational speed of the turbine 201. Conversely, opening the nozzle vanes 260, e.g., widening the openings between each of the nozzle vanes 260 may decrease the gas flow velocity into the turbine nozzle 210, retarding the turbine speed.

During braking events, where slowing of a vehicle by engine braking is demanded, the nozzle vanes 260 may be adjusted to a more closed position to decrease the cross-sectional area of the inlet passages 204 of turbine nozzle 210. By adjusting the nozzle vanes 260 more closed, the flow of gas from the exhaust manifold into turbine nozzle 210 may be restricted. A gas pressure in the exhaust manifold upstream of turbine nozzle 210 may increase. A back-pressure on engine cylinders created by the exhaust manifold pressure may be leveraged for engine braking, exerting a force against piston movement in the cylinders during an exhaust stroke. The force resisting piston movement may be a counterforce to the engine, resulting in increased pumping losses. A resulting negative, or braking torque is produced that effectively slows engine speed.

When vanes of a VGT are in a more closed position, the vanes may still allow a reduced amount of gas flow through openings between the vanes. In other words, the vanes may be configured to maintain a minimum amount of opening even when in a more closed position. A maximum exhaust braking torque provided by closing the VGT vanes may be bound, in part, by a minimum gas flow rate through the vanes when adjusted to a more closed position. The minimum opening of the vanes may vary depending on a geometry of the VGT. For example, some VGTs may have a minimum opening that is 30% of a maximum opening, e.g., a fully open position, of the vanes. Other VGTs may have minimum openings of 10% or 20% of the maximum opening. The maximum exhaust braking torque may also be dependent upon a maximum flow rate of air into an engine which may be low due to a low boost pressure provided by a turbocharger compressor during braking events.

A more closed position may include a position of the vanes where less air may flow through compared to a more open position. In some examples, a more closed position may be utilized during lower engine loads or other engine operating conditions where exhaust gas production is insufficient to meet a desired boost demand. As such, a more closed position may decrease an opening between adjacent turbine blades, thereby accelerating exhaust gas flow through the opening to the turbine, mimicking the effects of exhaust gas production at higher engine loads.

As described above, the engine may alternatively have a fixed geometry turbocharger (FGT) instead of the VGT. The geometry of the turbine nozzle is invariable in the FGT. Exhaust gas flow to the FGT turbine may be controlled by an exhaust waste gate, e.g., the waste gate 74 of FIG. 1.

When the waste gate is fully closed and blocking gas flow therethrough, all exhaust gas flow through the exhaust manifold is delivered to the FGT turbine. By increasing gas flow to the FGT turbine and blocking flow around the FGT turbine through a bypass provided by the waste gate, exhaust manifold pressure upstream of the FGT turbine may increase. However, similar to the vanes of the VGT, the waste gate may be configured to maintain a minimum opening even when in a most closed position, such as an opening that is 5% or 10% of a maximum opening of the waste gate. Thus, a maximum increase in exhaust manifold pressure for exhaust braking may be affected by the minimum opening of the waste gate that may be maintained regardless of engine operations. In a hybrid electric vehicle (HEV), regenerative braking may be used as a first method of decelerating the HEV, to capture energy that would otherwise be wasted during braking of the HEV. Kinetic energy propelling a vehicle forward may be converted to electrical energy and stored in an electric energy storage device, such as the traction battery 98 of FIG. 1. When a braking request is indicated, such as the electric machine 90 of FIG. 1, regenerative braking may include operating the electric machine in a reverse direction so that the electric machine acts as a generator and converts the kinetic energy into electrical energy by charging the traction battery. Regenerative braking may thereby assist in slowing the vehicle and reducing use of the vehicle's mechanical brakes. However, when a state of charge (SOC) of the traction battery reaches full capacity, e.g., 100% charged), regenerative braking may be inhibited.

To provide or increase the braking torque, engine braking may be applied. The VGT (or FGT) may be operated with electrical assistance in response to a demand for engine braking. The VGT may be driven by a turbocharger electrical motor/generator (TEMG) coupled to the turbocharger and drawing electrical power from the traction battery. By consuming power during engine braking, the traction battery SOC is maintained below 100%, as long as replenishment of battery power by regenerative braking is not higher than consumption of energy by the TEMG, allowing regenerative braking to occur concurrently with engine braking. The electrically-assisted operation of a turbocharger during engine braking is described in further detail below with reference to FIG. 3.

A schematic diagram 300 of an engine system 302 is shown in FIG. 3. The engine system 302 includes a turbocharger 304, which may be configured to be a VGT with variable nozzle vanes, such as the nozzle vanes 260 of FIG. 2, adjustable to moderate exhaust gas flow into a nozzle of a turbine 306 of the VGT 304. Alternatively, the turbocharger 304 may be a fixed geometry turbocharger (FGT) with exhaust gas flow to the FGT turbine controlled by a waste gate 334. A compressor 308 of the turbocharger 304 may be coupled to the turbine 306 by a drive shaft 310. Fresh air may be drawn in through an intake air passage 303 to an inlet of the compressor 308. Rotation of the turbocharger 304 may be driven by exhaust gas, flowing from an exhaust manifold 312 of the engine system 302 to the turbine 306. The exhaust gas may strike blades of the turbine 306, compelling rotation of the turbine 306 which, in turn, forces rotation of the compressor 308 via the drive shaft 310.

Rotation of the turbocharger 304 may also be driven by a turbocharger electrical motor/generator (TEMG) 314, coupled to the drive shaft 310. The TEMG 314 may draw power from a battery 316 that may be a traction battery of the HEV. The battery 316 may also be coupled to a driveline electrical motor/generator (DEMG) 318, used similarly as the electric machine 90 of FIG. 1, that draws power from the battery 316 to propel rotational motion of the HEV wheels when the HEV is not utilizing combustion energy. Both an engine 320 and the DEMG 318 may be coupled to the HEV wheels as alternative, mutually exclusive prime movers for the REV.

The engine 320 is shown in FIG. 3 with a set of four inline cylinders 322, which may be adapted to combust diesel, wherein at least one of the cylinders 322 may be used similarly to cylinder 30 of FIG. 1. In other examples, the engine 320 may have a variety of possible cylinder arrangements such as six, eight, or twelve cylinders, positioned inline, as a V engine, or as a flat engine, etc. It will be appreciated that a type of engine included in the HEV should not depart from the scope of the present disclosure. The compressor 308 is coupled to the engine 320 by an air passage 324 and an intake manifold 326, the intake manifold 326 directly upstream of the engine 320. The engine 320 is also coupled to the turbine 306 via the exhaust manifold 312, positioned directly downstream of the engine 320 and an exhaust passage 328.

The engine system 302 may include a high-pressure exhaust gas recirculation (HP-EGR) passage 330 with an HP-EGR valve 332 disposed in the HP-EGR passage, controlling flow of exhaust gas from the exhaust manifold 312, upstream of an emissions device 336, similar to the emissions device 70 of FIG. 1, to the intake manifold 326. The engine system 302 may also include an exhaust waste gate 334, used similarly as the waste gate 74 of FIG. 1, to reduce an amount of energy supplied to the turbine 306 via exhaust gas flow. Exhaust gas may pass through the turbine 306 or through the exhaust waste gate 334 and flow to the emissions device 336 to remove substances from the exhaust gas prior to release to the atmosphere.

A controller 340, which, in some examples, may be the controller 12 of FIG. 1, may be configured to determine events where slowing of the HEV by non-mechanical braking, such as regenerative and/or engine braking, may be desired. For example, the controller 340 may receive information from a vehicle gyro sensor that the HEV is descending a hill. The vehicle may accelerate undesirably during downhill travel. As another example, a request for speed reduction may be indicated by a tip-out at an operator-controlled input device such as an accelerator pedal controlling delivery of fuel to the engine 320. To decrease vehicle speed, the controller 340 may command initiation of regenerative braking, depending on the SOC of the battery 316, regenerative braking prioritized over engine braking due to recapture of energy that recharges the battery 316. However, regenerative braking may not be available if the battery 316 is fully charged.

When the battery SOC is at full capacity and regenerative braking is disabled, engine braking may be applied. Alternatively, in other examples, active regenerative braking alone may not provide enough braking torque to slow vehicle speed during, for example, descent of steep slopes. During the braking event, little to no boost power is demanded and exhaust gas pressure in the exhaust manifold 312 may be low compared to when the operator is pressing an accelerator pedal and requesting an increase in engine torque. As a result, the turbine 306 may spin the compressor 308 at a low speed, drawing a low rate of air flow into the intake manifold 326, a direction of flow indicated by arrows 338. The low intake flow may inhibit accumulation of exhaust pressure in the exhaust manifold 312, even when the VGT vanes, when the turbocharger 304 is the VGT, are in a closed position, restricting gas flow through the turbine nozzle or the waste gate 334 is fully closed when the turbocharger 304 is the FGT. Engine braking torque provided by a pressure differential between the exhaust manifold 312 and the intake manifold 326 may not be sufficient to decelerate the HEV without use of mechanical brakes.

The braking torque may be enhanced by electrically-assisted engine braking. The TEMG 314 may be activated upon detection of the braking request, rotating the turbocharger 304 at a higher speed than enabled by the exhaust pressure generated in the exhaust manifold 312 without electrical assistance. The higher flow into the engine 320 increases production of exhaust gas, formed primarily of combusted air. When the turbocharger 304 is configured as the VGT, the VGT vanes may be adjusted to the closed position, restricting flow to the turbine 306, with the exhaust waste gate 334 closed and blocking flow therethrough, allowing pressure to build in the exhaust manifold 312. The higher pressure in the exhaust manifold 312 than otherwise achieved without electrical assistance may increase the braking torque provided by engine braking while accommodating a specific configuration of the VGT used, e.g., according to the minimum opening between the vanes of the VGT. Alternatively, when the turbocharger 304 is the FGT, the opening of the exhaust waste gate 334 is decreased or fully closed.

Parameters for engine braking, such as turbocharger speed, power supply to the TEMG 314 to operate the turbocharger, and positioning of the VGT vanes and/or the exhaust waste gate 334, may be tuned based on information received at the controller 340 from a plurality of sensors 342 and used by the controller 340 to command a plurality of actuators 344 of the engine system 302. The plurality of sensors 342 may include a position sensor 346 at the turbine 306 to monitor the position or angle of the VGT vanes, a mass air flow (MAF) sensor 348 in the intake air passage 303, an intake manifold pressure sensor 350 (similar to the MAP sensor 121 of FIG. 1), an exhaust manifold pressure sensor 352, a battery monitor 354 that determines the SOC of the battery 316 as well as various other sensor disposed in the engine system 302. The plurality of actuators 344 may include a variable vane control, such as the variable vane control 72 of FIG. 1, adjusting the position of the VGT vanes, the TEMG 314, HP-EGR valve 332, the exhaust waste gate 334 (which may be maintained closed when the TEMG 314 is activated during braking events), amongst various other actuators of the engine system 302. The controller 340 receives signals from the various sensors of FIG. 3 and employs the various actuators of FIG. 3 to adjust engine operation based on the received signals and instructions stored on a memory of the controller 340. The engine system 302 of FIG. 3 may also include any of the sensors and actuators shown in FIG. 1, such as the boost pressure sensor 122, the UEGO sensor 126, etc. For example, the controller 340 may use information from the battery monitor 354 about the current battery SOC to adjust an amount of power delivered to the TEMG 314 to operate the turbocharger 304 at a speed that balances a desired amount of engine braking with maintenance of the battery SOC at slightly below 100% via regenerative braking.

The additional braking torque supplied by electrically-assisted engine braking may be dependent upon a difference between an exhaust manifold pressure $P_2$ and an intake manifold pressure $P_1$. Increasing the difference ($P_2-P_1$) may increase the resulting engine braking torque. However, the exhaust manifold pressure $P_2$ may not exceed a maximum pressure tolerance of the turbine 306. Alternatively, the turbine 306 may have a maximum tolerated speed. The maximum pressure tolerance and/or maximum speed tolerance of the turbine 306 may determine an upper boundary of the exhaust manifold pressure $P_2$ that may be generated without degradation of the turbine 306.

To maintain the exhaust manifold pressure $P_2$ and/or turbine speed below tolerances of the turbine 306, a torque output of the TEMG 314 may be adjusted by regulating an amount of electrical power delivered to the TEMG 314 by the battery 316. For example, when the turbine speed is approaching the maximum tolerated speed of the turbine 306, power to the TEMG 314 may be reduced to decrease the speed. In addition, when the exhaust manifold pressure $P_2$ is approaching the maximum pressure tolerance of the turbine 306, the positioning of the variable vanes may be adjusted to allow level of energy consumption by the TEMG 314 to be sustained so that continuous use of regenerative braking is enabled. Instead of relying solely on decreasing torque output of the TEMG 314, the vanes may be adjusted more open, or the opening of exhaust waste gate 334 may be widened, to reduce the exhaust manifold pressure $P_2$. In some examples, adjustments to TEMG 314 torque output and positioning of the vanes or exhaust waste gate 334 may be coordinated to balance prioritization of regenerative braking with suitable battery energy consumption and maintenance of the pressure and speed tolerance of the turbine 306 within a threshold margin of the turbine's maximum tolerance ratings.

When used in combination with regenerative braking, a braking torque provided by both engine braking and regenerative braking may reduce use of mechanical brakes, prolonging a useful lifetime of the mechanical brakes, as well as increasing a fuel economy of the HEV by recharging the battery 316 during regenerative braking. Regenerative braking may drive a reverse rotation of the DEMG 318, inducing operation of the DEMG 318 as a generator that converts the rotational energy into electrical energy that is stored in the battery 316. However, as described above, regenerative braking may be disabled when the SOC of the battery reaches full capacity.

The disabling of regenerative braking may be circumvented by coupling the TEMG 314 to the battery 316 so that operation of the TEMG 314 consumes energy stored in the battery 316 (e.g., battery SOC decreases). Thus, when engine braking is conducted, the TEMG 314 draws power from the battery 316 over a duration of the braking event, decreasing the battery SOC to an SOC below 100%. The power consumed by the TEMG 314 may be at least partially replenished by concurrent regenerative braking. In some examples, a coupling of regenerative braking with engine braking may be a net zero process where the energy consumed by engine braking is equal to an amount of energy replenished by regenerative braking. The controller 340 may be configured to determine when applying engine braking in addition to regenerative braking may provide better fuel economy, despite consumption of battery power during operation of the TEMG 314. The SOC of the battery 316 may thus be maintained slightly below full capacity, maximizing braking torque provided by both engine braking and regenerative braking, and increasing a fuel efficiency of the HEV by simultaneously recharging the battery 316 as the TEMG 314 draws power from the battery 316.

In some examples, regenerative braking may be initiated in response to the battery SOC being outside of a threshold of the full battery SOC (e.g., 100%). If it is determined that regenerative braking may meet a current braking demand independently, then the engine braking may be terminated. Additionally or alternatively, if the regenerative braking may independently meet the braking demand but a duration of the braking demand is such that the battery SOC may be replenished to the full battery SOC, then the engine braking may be maintained such that regenerative braking and engine braking are executed in tandem. The engine braking may be disabled once it is determined that the battery SOC may be less than or equal to the full battery SOC at an end of the braking demand.

A duration of the braking demand may be estimated based on feedback from a navigation system, GPS, or other location tracking device. Additionally or alternatively, traffic data, topography, weather, and other current information may be used to determine the duration of the braking demand. For example, if a vehicle is driving downhill, a grade and length of the hill may be determined to estimate an amount of braking desired and the duration of the braking. If the battery SOC is full to begin the braking, then engine braking may be initially utilized to decrease the battery SOC, thereby creating a buffer once regenerative braking is initiated. Charging the battery SOC when the battery is at full SOC may decrease a lifespan of the battery and result in degradation (e.g., dendrite formation, reduce charge capacity, and the like). Regenerative braking may be established once the battery SOC is sufficiently decreased by the engine braking. As such, one or more of mechanical braking, engine braking, and regenerative braking may be utilized to slow the vehicle speed. Once it is determined that regenerative braking may not provide more power to the battery than a difference between a current battery SOC and a full battery SOC, then the engine braking may be deactivated.

The amount of braking torque supplied by electrically-assisted engine braking and regenerative braking, may be a function of the pressure difference between the exhaust manifold and intake manifold ($P_2-P_1$) and the battery SOC. As elaborated previously, the pressure difference is subject to speed and/or pressure tolerances of the turbine, flow restriction based on the position of the VGT vanes and/or exhaust waste gate opening, and regenerative braking application is dependent upon the battery status. For a particular engine system, the braking torque may be maximized by tuning the torque generated by the TEMG to rotate the turbocharger so that the turbine speed is below a maximum tolerable speed specific to the turbine. The TEMG torque may also be used to estimate the resulting boosted intake manifold pressure $P_1$ and exhaust manifold pressure $P_2$ to adjust the TEMG torque so that $P_2$ is maintained below a maximum tolerated pressure specific to the turbine while the pressure difference ($P_2-P_1$) is high enough to provide the demanded amount of braking torque. Additionally, TEMG torque may be adjusted based on a minimum exhaust gas flow rate through the VGT vanes when the vanes are in the closed position. The boost pressure resulting from the TEMG torque may be adapted to accommodate a loss in pressure in the exhaust manifold due to the minimum flow through the VGT vanes and/or exhaust waste gate.

Furthermore, the TEMG torque may be regulated based on the SOC of the battery to provide a balance between an amount of braking torque provided by regenerative braking and an amount of electrical energy consumed by the TEMG to maintain a desirable level of fuel economy of the HEV. The TEMG torque supply may be adjusted to consume a minimum possible amount of energy from the battery by adjusting the position of the VGT vanes and/or exhaust waste gate opening, thereby providing a sufficient amount of engine braking torque in combination with regenerative braking while also maintaining a high percentage of battery SOC.

A method 400 for decelerating a vehicle is shown in FIG. 4. The vehicle may be a hybrid electric vehicle (HEV) adapted with a diesel engine, such as the vehicle 5 of FIG. 1. The HEV may include a turbocharger that may be powered by exhaust gas during vehicle acceleration and vehicle operations where delivery of boosted air to an engine intake manifold is demanded. The turbocharger may be a variable geometry turbocharger (VGT) with variable vanes disposed in a turbine of the VGT. A positioning of the vanes may be adjusted so that openings between the vanes may widened or narrowed, e.g., adjusted more open or more closed, to control exhaust gas flow into the turbine. Alternatively, the turbocharger may be a fixed geometry turbocharger (FGT) without adjustable vanes. Flow of exhaust gas to the FGT turbine may be controlled by an exhaust waste gate, such as the waste gate 74 of FIG. 1 or 334 of FIG. 3, with an adjustable opening. When deceleration of the vehicle is requested and exhaust gas pressure in an exhaust manifold of the HEV engine is low, e.g., a pressure differential between the exhaust manifold and the intake manifold is not large enough to allow exhaust braking, relying solely on restricting exhaust gas flow to the turbine, to meet a braking torque deficiency, the VGT or FGT may be driven by a turbocharger electrical motor/generator (TEMG) that draws power from a vehicle battery to provide engine braking by increasing air flow to the engine. A consumption of battery power may be balanced by recharging of the battery as provided by regenerative braking. In some examples, regenerative braking may be prioritized over engine braking. Instructions for carrying out method 400 and the rest of the methods included herein may be executed by a controller, such as controller 12 of FIG. 1 or controller 340 of FIG. 3, based on instructions stored on a memory of the controller and in conjunction with signals received from sensors of the engine system, such as the sensors described above with reference to FIGS. 1 and 3. The controller may employ engine actuators of the engine system to adjust engine operation, according to the methods described below.

At 402, the method includes the method includes estimating and/or measuring the operating conditions of the engine. These may include, for example, engine speed and torque, mass air flow into the engine intake, a position of the VGT vanes, a boost pressure in the intake manifold, an opening of the exhaust waste gate, and an exhaust manifold pressure. For example, the controller may determine the position of the VGT vanes based on information from a position sensor in the VGT turbine nozzle, such as the position sensor 346 of FIG. 3. The controller may then use the sensed position to adjust the vanes to widen or narrow openings in between the vanes to regulate exhaust flow into the turbine, thereby controlling a boost pressure provided by the VGT.

The controller determines, at 404, if deceleration of the HEV is requested. As an example, the request may be initiated by a change in an angle of the HEV, as detected by a gyro sensor in the HEV, due to the REV descending along a downhill slope. The HEV may accelerate in an uncontrolled manner due to gravitational pull when traversing the downhill slope. In another example, slowing of vehicle speed may be indicated by an operator releasing, e.g., tipping out of, an accelerator pedal. Other examples of requests for vehicle deceleration without utilizing mechanical braking are possible and may be implemented without departing from the scope of the present disclosure.

If no request for speed reduction is detected, the method proceeds to 406 to continue vehicle operation under current engine parameters. The positioning of the VGT vanes may be maintained or adjusted according to boost demand and boost demand may remain constant or increase. Engine operation may alternate between deriving energy from fuel combustion or from a driveline electric motor/generator (DEMG), such as the DEMG 318 of FIG. 3, that draws power from the battery. The method then returns to the start.

If the request for deceleration is detected, the method continues to 408 to determine if the battery SOC less than 100%. If the battery is fully charged, e.g., not less than 100%, method 400 continues to method 500 of FIG. 5. However, if the battery SOC is not at 100% then the battery is less than fully charged and the method continues to 410 to activate regenerative braking. Activating regenerative braking may include directing kinetic energy of the HEV's forward momentum, which may otherwise dissipate as heat when mechanical brakes are applied, towards operating the DEMG in a reverse direction. The DEMG acts as a generator, converting the kinetic energy to electrical energy stored in the battery while simultaneously retarding rotation of the HEV wheels.

In another example, method 400 may proceed from 408 to method 500 if the battery SOC is within a threshold of 100% rather than at 100%. The threshold may be within, for example, 10% of full capacity and may provide a margin below 100% so that regenerative braking does not become disabled quickly after initiation due to rapid recharging of the battery to 100%, before effective slowing of the HEV is enabled. By setting the threshold for battery SOC, a buffer zone is provided that allows a period of time to elapse after initiating regenerative braking so that sufficient braking torque is generated to alter the vehicle speed.

At 412, the method includes determining if the braking torque supplied by regenerative braking meets the brake torque demand to slow the vehicle speed to a desired speed. The amount of speed reduction enabled by the braking torque may be a difference between a current vehicle speed and a target speed for downhill descent. As an example, the target speed may be based on the speed of the HEV prior to downhill travel and the speed prior to downhill travel may be stored in the controller's memory. The controller may initiate operations, such as regenerative and engine braking, to maintain the HEV speed at the speed before involuntary vehicle acceleration. As another example, the reduction in vehicle speed may be proportional to an amount that the operator releases the accelerator pedal, as determined by a pedal position sensor. For example, if the operator tips out of the accelerator pedal by 50% of a full range of motion of the pedal, a target speed reduction may be 30% of the current speed or an accelerator pedal tip out of 20% of the full range of pedal motion may correspond to a speed reduction of 10%.

Figure 5:
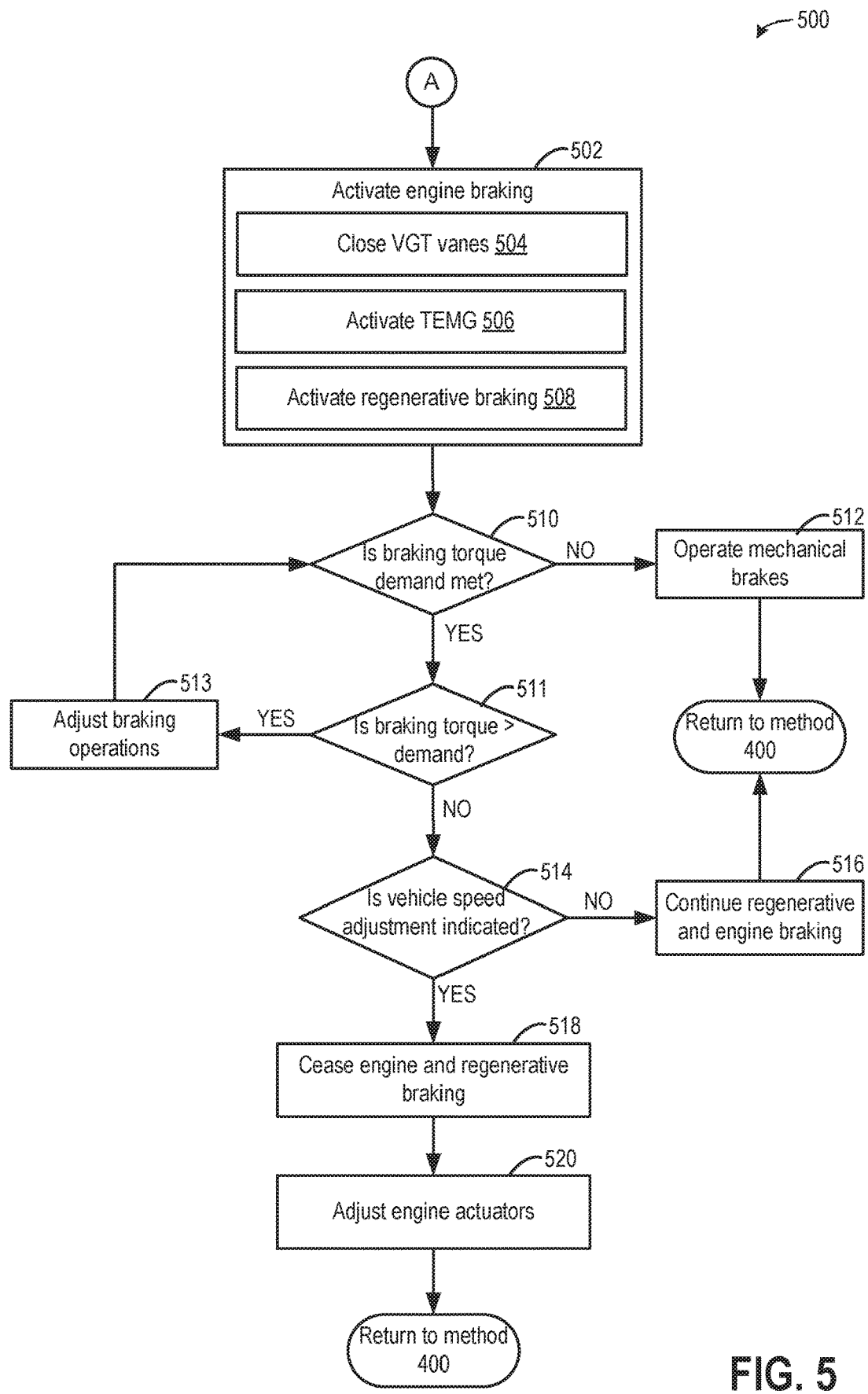
FIG. 5 is a continuation of the method of FIG. 4.
Figure 6:
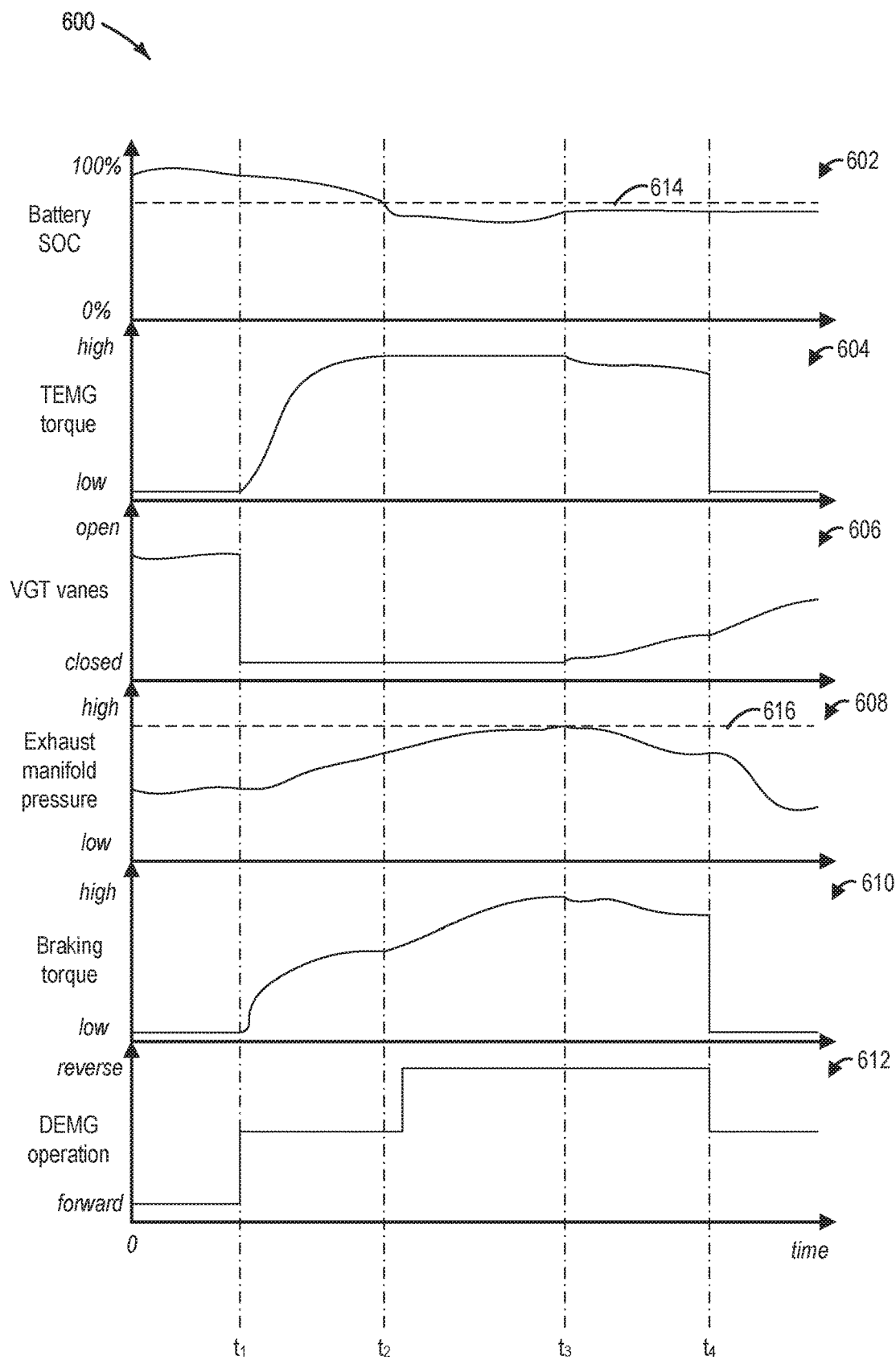
FIG. 6 shows example operations of an engine system in response to a request for vehicle deceleration, the vehicle configured to use electrically-assisted engine braking in combination with regenerative braking.

If the braking torque demand is not met by regenerative braking, the method proceeds to method 500 of FIG. 5. If regenerative braking provides sufficient braking torque to meet the braking torque demand, the method continues to 414 to determine whether a change in vehicle speed is requested. For example, an adjustment to vehicle speed may be indicated by the operator depressing the accelerator pedal to request more engine torque to accelerate the HEV. Alternatively, the operator may choose to reduce vehicle speed by releasing the accelerator pedal and depressing a brake pedal to activate mechanical brakes of the HEV.

If no adjustment to vehicle speed is indicated, regenerative braking is maintained at 416, as long as the battery SOC is below 100% or below the threshold SOC, and the method returns to the start. However, if a change to vehicle speed is requested, regenerative braking is terminated at 418. The DEMG no longer runs as a generator and charging of the battery is ceased. To accommodate the adjustment in vehicle speed, engine actuators are adjusted at 420. For example, if increased engine torque is requested, the VGT vanes may be adjusted more open to increase the VGT speed, an EGR valve, such as the EGR valve 80 of FIG. 1 may be adjusted to regulate recirculation of exhaust gas to the intake manifold, and an exhaust waste gate, such as the waste gate 74 of FIG. 1 and 334 of FIG. 3, may be moderated to control exhaust gas flow to the VGT turbine. Method 400 then returns to the start.

Method 500 of FIG. 5 may continue from method 400 and includes activating engine braking in the HEV at 502. Implementing engine braking includes adjusting the VGT vanes more closed at 504. When the VGT vanes are more closed, openings between the vanes are narrowed but not entirely closed off so that flow through the vanes is blocked. Instead, the more closed position of the vanes may be a minimum diameter of the openings, restricting but not stopping gas flow. The flow restriction imposed by the more closed VGT vanes allows pressure to accumulate upstream of the vanes, such as in the exhaust manifold.

In another example, the turbocharger may be the fixed geometry turbocharger (FGT) without mobile vanes. The exhaust waste gate controlling flow to the turbocharger turbine may be adjusted more closed to restrict flow to the turbine, thereby allowing backpressure to build upstream of the exhaust waste gate, in the exhaust manifold.

Engine braking may also include activating the TEMG to drive rotation of the VGT (or FGT) at 506. The TEMG may be actuated to rotate a drive shaft of the VGT or FGT, powered by electrical energy stored in the battery. As the TEMG consumes battery power, the battery SOC may drop below 100% or below the threshold SOC to allow regenerative braking to be activated. A concurrent operation of regenerative braking during engine braking may offset battery depletion by simultaneously charging the battery as the DEMG is driven in the reverse direction. Furthermore, the exhaust waste gate and EGR valve may be closed during engine braking.

At 510, the method includes determining if engine braking, in combination with regenerative braking, meets a demand for braking torque. The demand for braking torque may be based on a reduction in vehicle speed to slow the HEV to a desired speed. As described above for method 400, the amount of speed reduction enabled by the braking torque may be a difference between a current vehicle speed and a target speed for downhill descent, for example. The target speed may be based on the speed of the HEV prior to downhill travel or the reduction in vehicle speed may be proportional to an amount that the operator releases the accelerator pedal, as determined by a pedal position sensor.

If the braking torque supplied falls short of the demand, the method continues to 512 to engage mechanical brakes of the HEV to increase the braking torque. The mechanical brakes may be activated if, for example, the HEV is adapted with autobraking. Alternatively, the when the braking torque is determined to be less than the demand, an alert may be provided to the operator, such as an alarm or a light indicator that mechanical braking is demanded. The method then returns to the start of method 400 of FIG. 4. If the braking torque meets the demand, the method proceeds to 511 to determine if the braking torque provided by exhaust and regenerative braking exceeds the braking torque demand.

If more braking torque is generated than an amount sufficient to decelerate the HEV as desired, regenerative braking may be terminated at 513. If engine braking alone still generates excess braking torque, adjustments to engine braking operations may be adjusted, such as widening the openings between the VGT vanes to decrease exhaust manifold pressure, decreasing the TEMG torque output, or opening the exhaust waste gate to vent exhaust pressure. In some examples, the TEMG may be deactivated and engine braking may be ceased and regenerative braking may also be terminated. The method then returns to 510 to determine whether the braking torque supplied by exhaust and regenerative braking meets the braking demand.

If the braking torque does not exceed the braking torque demand, the method continues to 514 to determine whether a change in vehicle speed is requested. As described above for method 400, an adjustment to vehicle speed may be indicated, for example, by the operator depressing the accelerator pedal to request more engine torque to accelerate the HEV or the operator may choose to reduce vehicle speed by releasing the accelerator pedal and depressing a brake pedal to activate mechanical brakes of the HEV.

If no adjustment to vehicle speed is indicated, exhaust and regenerative braking are maintained at 516 and the method returns to the start of method 400 of FIG. 4. However, if a change to vehicle speed is requested, exhaust and regenerative braking are terminated at 518. The TEMG is deactivated, the DEMG no longer runs as a generator and battery charging is terminated. To accommodate the adjustment in vehicle speed, engine actuators are adjusted at 518. For example, if increased engine torque is requested, the VGT vanes may be adjusted more open to increase the VGT speed, an EGR valve, such as the EGR valve 80 of FIG. 1 may be adjusted to regulate recirculation of exhaust gas to the intake manifold, and an exhaust waste gate, such as the waste gate 74 of FIG. 1 and 334 of FIG. 3, may be moderated to control exhaust gas flow to the VGT turbine. Method 500 then returns to the start of method 400 of FIG. 4.

Example operations during an engine braking event that does not include use of mechanical vehicle brakes are shown in a timeline map 600 in FIG. 6. The engine may be an engine of an HEV that has a VGT coupled to a TEMG. Time is plotted along the x-axis in map 600 and various engine actuators and conditions are depicted along the y-axis. The actuators and conditions include a battery SOC at plot 602, a torque output of the TEMG at plot 604, a position of vanes of the VGT at plot 606, an exhaust manifold pressure as measured by a pressure sensor at plot 608, a cumulative amount of braking torque provided by exhaust and regenerative braking at plot 610, and a direction of operation of a DEMG at plot 612. Plot 602 includes a first threshold 614 that is a battery SOC below 100% but greater than 50%, such as 70% or 80%. The first threshold 614 may be a battery SOC at or below which regenerative braking may be activated. A second threshold 616 is included at plot 608. The second threshold may be a pressure in the exhaust manifold that reaches a maximum pressure tolerance of a VGT turbine. In other examples, the second threshold may be based on a maximum tolerated speed of the VGT turbine. Degradation of the turbine may occur at exhaust manifold pressures or speeds above the second threshold 616.

Prior to $t_1$ the HEV may be operating with a fully charged or nearly fully charged battery, with an SOC above the first threshold 614. The TEMG is inactive and torque output is at zero. The HEV may be travelling forwards with the VGT vanes in a position where openings between the vanes are wider than when the VGT vanes are in a closed position. The wider openings between the VGT vanes allows more exhaust gas to flow into a VGT turbine nozzle, driving faster rotation of the VGT and higher boost pressure in an engine intake, than when the vanes are closed. The exhaust manifold pressure is at a level between high and low, the pressure generated by combustion of fuel and air at engine cylinders and moderated by the position of the VGT vanes and by an opening of an exhaust waste gate. No braking torque is produced during active forward propulsion of the HEV. The DEMG is either actively driving the forward movement of the HEV by transferring energy from the battery to the wheels of the HEV or on standby, prepared to control motion of the HEV when propulsion by fuel combustion is ceased. The DEMG may be operating as a motor, rotating in a first, forward direction.

At $t_1$, a request for deceleration of the HEV is indicated. As described above for method 400 of FIG. 4, the request may be initiated by a change in an angle of the HEV, as detected by a gyro sensor in the HEV, due to the HEV descending along a downhill slope or slowing of vehicle speed may be indicated by an operator releasing, e.g., tipping out of, an accelerator pedal. Engine braking is initiated without regenerative braking, regenerative braking inhibited by the near full capacity of battery above the first threshold 614. The battery SOC remains unchanged between $t_1$ and $t_2$. The TEMG, in response to the request for vehicle deceleration, is activated, drawing power from the battery to produce torque to rotate the VGT. The torque output of the TEMG increase between $t_1$ and $t_2$. The VGT vanes are adjusted to the closed position at $t_1$, creating a flow restriction into the turbine. The closed position of the VGT vanes may be at 30%, for example, of a width of the openings when the openings are fully opened. Between $t_1$ and $t_2$, the exhaust manifold pressure rises due to the flow restriction imposed by the VGT vanes. The braking torque supplied by engine braking also increases between $t_1$ and $t_2$ while the DEMG is stationary.

At t2, consumption of power from the battery by the TEMG draws the SOC of the battery to the threshold. Regenerative braking is activated, driving reverse rotation of the DEMG so that the DEMG acts as a generator and charges the battery. Energy used by the TEMG may be balanced by recharging of the battery through regenerative braking so that the SOC fluctuates little between $t_2$ and $t_3$. The TEMG torque remains relatively uniform between $t_2$ and $t_3$ while the VGT vanes remain closed. The exhaust manifold pressure continues to slowly rise while the braking torque increases more rapidly due to the additional braking torque provided by regenerative braking.

At $t_3$, the exhaust manifold pressure reaches the second threshold 616. In order to reduce the exhaust manifold pressure below the pressure tolerance of the turbine, power directed to the TEMG is reduced to decrease the torque output of the TEMG. Decreasing the torque output of the TEMG slows the VGT, reducing air flow to the engine intake and lowering the exhaust manifold pressure. The openings between the VGT vanes are widened by adjusted to the vanes to a more open position. Widening the openings allows more exhaust gas from the exhaust manifold to flow through the vanes, decreasing the exhaust manifold pressure and enabling the TEMG to continue consuming enough battery power to allow regenerative braking to continue. The battery SOC increases slightly, remaining below the second threshold 616 and relatively uniform between $t_3$ and $t_4$. DEMG operation continues in the reverse direction to charge the battery. At $t_4$, a change in vehicle speed is requested. The request may be an operator-induced tip in at the accelerator pedal to increase vehicle speed. In response, engine braking and regenerative braking are terminated and the braking torque drops to zero. The TEMG is deactivated and the TEMG torque output falls to zero. The VGT vanes adjusted more open, allowing more exhaust gas to flow into the turbine and increase VGT speed. As a result, exhaust manifold pressure decreases. The DEMG is stationary. Alternatively, the DEMG may be operated in the motor mode to propel motion of the HEV. The battery SOC remains uniform.

In this way, electrically-assisted engine braking may be used to reduce vehicle speed by increasing a flow rate of air into an engine intake to increase a pressure gradient between an exhaust manifold and an intake manifold of the engine. The air flow into the intake manifold may be enhanced by operating a variable geometry turbocharger (VGT), adapted with variable vanes in a turbine nozzle of the VGT, during engine braking events with a turbocharger electric motor/generator. Alternatively, the engine may have a fixed geometry turbocharger (FGT) with the FGT turbine coupled to an exhaust waste gate providing a bypass around the FGT turbine and controlling exhaust gas flow to the FGT turbine. Activation of the VGT while the variable vanes are in a closed position, or of the FGT while the exhaust waste gate opening is narrowed, drives higher generation of exhaust gas due to the higher intake air flow and a flow restriction caused by the closed vanes results in higher exhaust manifold pressure, producing a higher braking torque than when engine braking is conducted without operating the VGT or FGT. When used in a hybrid electric vehicle (HEV), engine braking may be combined with regenerative braking so that regenerative braking may be applied continuously. The SOC of the battery may be maintained constantly at a level slightly below full capacity to allow uninterrupted usage of regenerative braking. As the TEMG drives operation of the VGT or FGT, the TEMG draws power from a vehicle battery, maintaining the battery SOC at less than 100%. Thus regenerative braking may be applied, the battery charging provided by regenerative braking balanced by the amount of energy consumed by the TEMG. An opening of the VGT vanes (or exhaust waste gate of the FGT) and speed of the turbocharger may be tuned to provide maximum braking torque while accommodating a minimum flow opening of the vanes or exhaust waste gate and maintaining the turbocharger speed and exhaust manifold pressure below a speed and pressure tolerance of the turbocharger turbine. Thus, the vehicle may be decelerated via engine operations rather than mechanical brakes, thereby prolonging a useful lifetime of the mechanical brakes.

The technical effect of electrically operating the turbocharger during engine braking is that a rate of air flow into an engine is increased, driving an increase in exhaust pressure that results in increased braking torque.

In one embodiment, a method includes consuming electrical energy from a battery to increase an amount of braking torque during engine braking in response to a battery SOC being greater than a threshold SOC. In a first example of the method, increasing the braking torque includes narrowing openings between variable vanes of a turbocharger turbine to increase an exhaust manifold pressure. A second example of the method optionally includes the first example, and further includes wherein consuming electrical energy from the battery includes operating a turbocharger electric motor/generator (TEMG) during engine braking to increase a torque output of the TEMG. A third example of the method optionally includes one or more of the first and second examples, and further includes, wherein increasing the torque output of the TEMG increases a flow of intake air into an engine and exhaust gas flow into the exhaust manifold while decreasing exhaust gas flow out of the exhaust manifold. A fourth example of the method optionally includes one or more of the first through third examples, and further includes, wherein operating the TEMG during engine braking is concurrent with halting power consumption from the battery to a driveline electric motor/generator (DEMG). A fifth example of the method optionally includes one or more of the first through fourth examples, and further includes, wherein operating the TEMG reduces a state of charge (SOC) of the battery below the threshold SOC and wherein regenerative braking is initiated in response to the battery SOC falling below the threshold. A sixth example of the method optionally includes one or more of the first through fifth examples, and further includes, wherein initiating regenerative braking drives the DEMG as a generator to recharge the battery concurrent with consumption of battery power by the TEMG. A seventh example of the method optionally includes one or more of the first through sixth examples, and further includes, wherein applying engine braking concurrent with regenerative braking maintains the battery SOC below 100%.

In another embodiment, a system includes a first electric motor coupled to a turbocharger, a second electric motor coupled to drive wheels of a vehicle, a battery powering operation of both the first electric motor and the second electric motor, and a controller including memory with instruction stored therein executable to: upon receiving a request for vehicle deceleration, operate the turbocharger to apply engine braking if a battery SOC is greater than a threshold SOC. In a first example, a torque output of the first electric motor is based on an amount of power supplied to the first electric motor from the battery and the torque output determines a speed of the turbocharger. A second example of the system optionally includes the first example, and further includes wherein the second electric motor is configured to operate in a generator mode when a state of charge (SOC) of the battery is below the threshold SOC. A third example of the system optionally includes one or more of the first and second examples, and further includes, wherein a braking torque produced by operating the turbocharger with the first electric motor is increased when the second electric motor operates in the generator mode. A fourth example of the system optionally includes one or more of the first through third examples, and further includes, wherein an exhaust manifold pressure is increased when the turbocharger is operated by the first electric motor relative to engine braking without operation of the turbocharger.

In another embodiment, a method includes generating increased engine braking by electrically activating a turbocharger when a battery state of charge (SOC) is greater than a threshold SOC, and applying regenerative braking with the engine braking in response to a battery SOC falling below the threshold SOC. In a first example of the method, electrically activating the turbocharger includes driving rotation of the turbocharger by an electric motor drawing power from the battery while a driveline electric motor, also coupled to the battery, is stationary. A second example of the method optionally includes the first method, and further includes wherein applying engine braking includes increasing exhaust manifold pressure by adjusting variable vanes of the turbocharger to be more closed and by increasing air flow to an engine intake. A third example of the method optionally includes one or more of the first and second methods, and further includes, wherein maintaining the exhaust manifold pressure below a maximum pressure tolerance of a turbocharger turbine includes adjusting a position of the variable vanes and a torque output of the electric motor. A fourth example of the method optionally includes one or more of the first through third methods, and further includes, wherein decreasing a torque output of the electric motor maintains a speed of the turbocharger below a maximum speed tolerance of the turbocharger. A fifth example of the method optionally includes one or more of the first through fourth methods, and further includes, wherein applying regenerative braking simultaneous with engine braking includes balancing power drawn by the electric motor with charging of the battery by regenerative braking. A sixth example of the method optionally includes one or more of the first through fifth methods, and further includes, wherein balancing battery power drawn by the electric motor with battery charging by regenerative braking maintains the battery SOC below the threshold and enables continuous use of regenerative braking.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method comprising:
consuming electrical energy from a battery to increase an amount of braking torque during engine braking in response to a battery state of charge (SOC) being greater than a threshold SOC; and
initiating regenerative braking in response to the battery SOC falling below the threshold SOC, wherein initiating regenerative braking drives a driveline electric motor/generator (DEMG) as a generator to recharge the battery concurrent with consumption of battery power by a turbocharger electric motor/generator (TEMG).

2. The method of claim 1, wherein increasing the braking torque includes narrowing openings between variable vanes of a turbocharger turbine to increase an exhaust manifold pressure.

3. The method of claim 1, wherein consuming electrical energy from the battery includes operating the TEMG during engine braking to increase a torque output of the TEMG.

4. The method of claim 3, wherein increasing the torque output of the TEMG increases a flow of intake air into an engine and exhaust gas flow into an exhaust manifold while decreasing exhaust gas flow out of the exhaust manifold.

5. The method of claim 4, wherein operating the TEMG during engine braking is concurrent with halting power consumption from the battery to the DEMG.

6. The method of claim 5, wherein operating the TEMG reduces the SOC of the battery below the threshold SOC.

7. The method of claim 1, wherein applying engine braking concurrent with regenerative braking maintains the battery SOC below 100%.

8. A system for engine braking, comprising:
a first electric motor coupled to a turbocharger;
a second electric motor coupled to drive wheels of a vehicle;
a battery powering operation of both the first electric motor and the second electric motor; and
a controller including memory with instruction stored therein executable to:
upon receiving a request for vehicle deceleration, operate the turbocharger to apply engine braking if a battery state of charge (SOC) is greater than a threshold SOC; and
operating the second electric motor in a generator mode if the battery SOC is below the threshold SOC, wherein a braking torque produced by operating the turbocharger with the first electric motor is increased.

9. The system of claim 8, wherein a torque output of the first electric motor is based on an amount of power supplied to the first electric motor from the battery and the torque output determines a speed of the turbocharger.

10. The system of claim 8, wherein an exhaust manifold pressure is increased when the turbocharger is operated by the first electric motor relative to engine braking without operation of the turbocharger.

11. A method for decelerating a vehicle, comprising:
generating increased engine braking by electrically activating a turbocharger when a battery state of charge (SOC) is greater than a threshold SOC; and
applying regenerative braking with the engine braking in response to the battery SOC falling below the threshold SOC.

12. The method of claim 11, wherein electrically activating the turbocharger includes driving rotation of the turbocharger by an electric motor drawing power from the battery while a driveline electric motor, also coupled to the battery, is stationary.

13. The method of claim 12, wherein applying engine braking includes increasing exhaust manifold pressure by adjusting variable vanes of the turbocharger to be more closed and by increasing air flow to an engine intake.

14. The method of claim 13, wherein maintaining the exhaust manifold pressure below a maximum pressure tolerance of a turbocharger turbine includes adjusting a position of the variable vanes and a torque output of the electric motor.

15. The method of claim 14, wherein decreasing a torque output of the electric motor maintains a speed of the turbocharger below a maximum speed tolerance of the turbocharger.

16. The method of claim 15, wherein applying regenerative braking simultaneous with engine braking includes balancing power drawn by the electric motor with charging of the battery by regenerative braking.

17. The method of claim 16, wherein balancing battery power drawn by the electric motor with battery charging by regenerative braking maintains the battery SOC below the threshold SOC and enables continuous use of regenerative braking.

* * * * *